(12) United States Patent
Steiner

(10) Patent No.: US 6,477,748 B2
(45) Date of Patent: Nov. 12, 2002

(54) CORD LOCK AND ADJUSTABLE SECURING DEVICE

(76) Inventor: Karl T. Steiner, 2719 Country La., Erie, PA (US) 16506

( * ) Notice: Subject to any disclaimer, the term of this patent is extended or adjusted under 35 U.S.C. 154(b) by 0 days.

(21) Appl. No.: 09/940,137

(22) Filed: Aug. 27, 2001

(65) Prior Publication Data

US 2002/0042974 A1 Apr. 18, 2002

Related U.S. Application Data

(63) Continuation-in-part of application No. 09/409,826, filed on Oct. 1, 1999, now Pat. No. 6,279,205.

(51) Int. Cl.[7] .............................................. F16G 11/00
(52) U.S. Cl. ........................................ 24/130; 24/136 R
(58) Field of Search ........................... 24/115 R, 129 R, 24/130, 136 R, 115 M, 132 WL, 115 H, 711.1, 298–302; 294/82.14

(56) References Cited

U.S. PATENT DOCUMENTS

| | | | | | |
|---|---|---|---|---|---|
| 234,896 | A | * | 11/1880 | Thompson | 135/118 |
| 902,406 | A | * | 10/1908 | Huber | 24/129 R |
| 1,059,630 | A | * | 4/1913 | Poetzsch | 24/130 |
| 1,368,667 | A | * | 2/1921 | Thorson | 24/129 R |
| 1,422,804 | A | * | 7/1922 | Witte | |
| 1,515,418 | A | * | 11/1924 | Smith | 24/130 |
| 1,578,253 | A | * | 3/1926 | Austin | 174/207 |
| 1,652,351 | A | * | 12/1927 | Dyer | 24/129 R |
| 2,011,861 | A | * | 8/1935 | Knumann | 24/135 N |
| 2,043,463 | A | * | 6/1936 | Bullum | 24/136 R |
| 2,641,810 | A | * | 6/1953 | Gasink | 24/122.6 |
| 2,896,283 | A | * | 7/1959 | Huber | 24/115 R |
| 3,102,313 | A | * | 9/1963 | Arneson | 24/129 R |
| 3,988,810 | A | * | 11/1976 | Emery | 24/128 |
| 4,220,306 | A | * | 9/1980 | Cueto et al. | 24/129 R |
| 4,575,905 | A | * | 3/1986 | Torrey | 24/115 H |
| 4,719,668 | A | * | 1/1988 | Cavanagh | 24/130 |
| 5,339,498 | A | * | 8/1994 | Parsons | 24/115 M |
| 6,003,210 | A | * | 12/1999 | Facey et al. | 24/130 |
| 6,094,783 | A | * | 8/2000 | Parsons | 114/218 |
| 6,094,787 | A | * | 8/2000 | Chang | 24/712.1 |
| 6,279,205 | B1 | * | 8/2001 | Steiner | 24/130 |

FOREIGN PATENT DOCUMENTS

FR          2759916       *  8/1998

* cited by examiner

Primary Examiner—James R. Brittain
(74) Attorney, Agent, or Firm—Richard K. Thomson

(57) ABSTRACT

A frictional cord lock for use in locking one portion of a single length of cord relative to another. A first embodiment includes a cylindrical, barrel-shaped member having a cylindrical wall substantially surrounding a longitudinal axis, has a first cord end fixed in one opening in the cord lock. Second and third tear-drop shaped openings lie along a common axis that forms an angle with the longitudinal axis and receive a second portion of the cord, the first opening lying vertically between said the second and third openings. The cord slides freely in second and third openings when pulled along their common axis but locks when subjected to non-axial forces. The non-axial forces pull the cord into the v-shaped portion of the openings pinching the cord and securing them in place. A second embodiment employs a generally horizontal v-shaped channel to lock the cord in place. A third embodiment has an open side enabling the cord to be easily threaded into the lock and uses a serrated, slidable wedge lock to effect positive locking, while a fourth embodiment utilizes a rotational locking ring with serrated portions to engage the cord and provide non-slip adjusted locking.

11 Claims, 5 Drawing Sheets

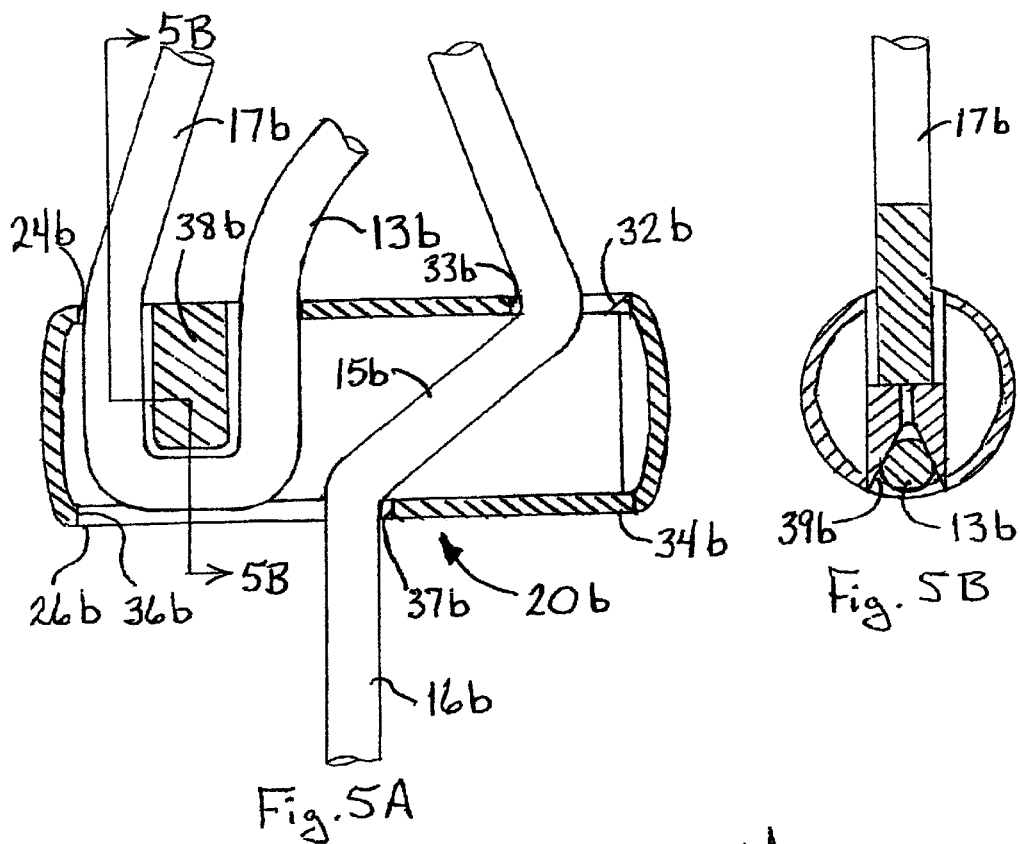
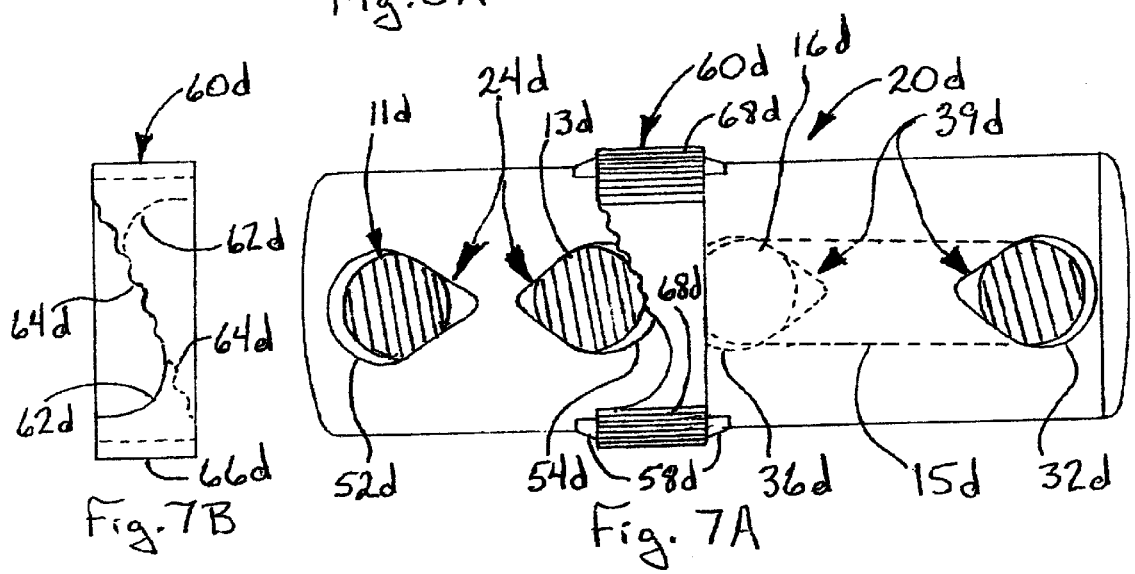

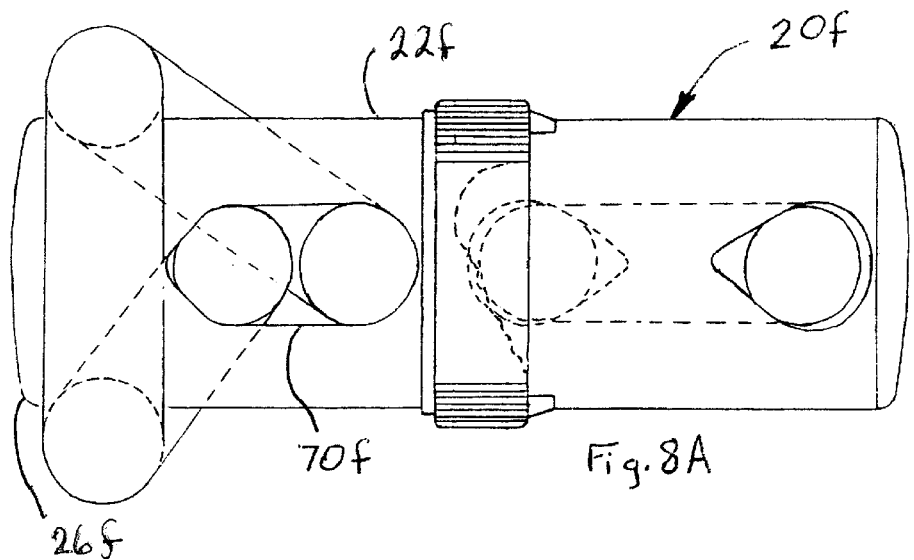
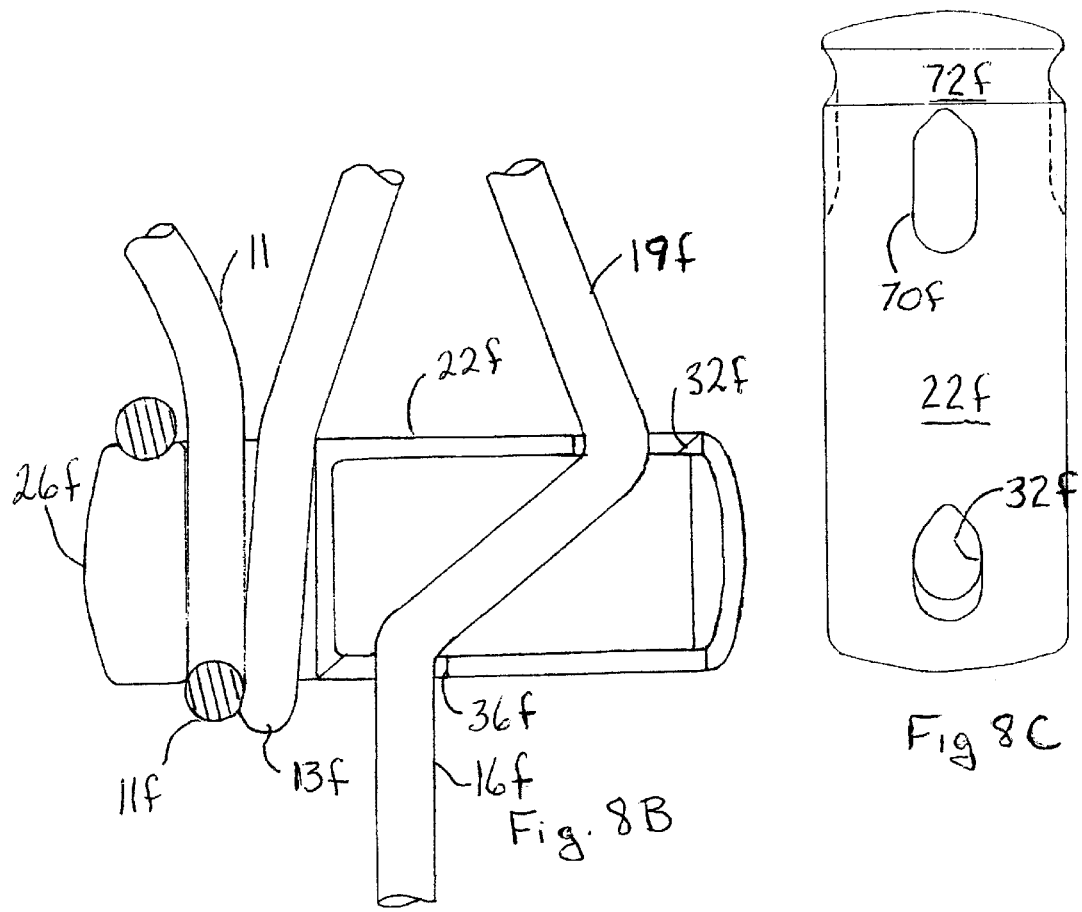

CORD LOCK AND ADJUSTABLE SECURING DEVICE

This application is a continuation-in-part of U.S. application Ser. No. 09/409,826 filed Oct. 1, 1999, now U.S. Pat. No. 6,279,205.

BACKGROUND AND SUMMARY OF THE INVENTION

The present invention is directed to a device for adjustably locking a position of a cord. More particularly, the present invention is directed to an improved cord lock for use in adjustably securing the size of a loop, and the like. Further, it is a feature of the present invention to provide an adjustable length cord for use in a variety of applications. Additionally, a ring lock is provided for cylindrical configurations and a slide lock for non-cylindrical applications, each of which will afford non-slip locking of the cord. This application is related to an application entitled Cord Lock which is filed contemporaneously herewith.

Locking devices for cords are generally complicated and difficult to operate. A number of these devices involve a biasing spring which causes coacting halves of an opening or of aligned openings to bite the edges of a cord to lock it against movement. The spring is subject to rust and fatigue resulting in failure of the lock.

The present invention provides an improved cord lock in which the tension on the cord shifts a portion of it into a v-shaped portion of the locking device securing the lock to the cord preventing relative movement therebetween. In addition, it is an aspect of the present inventino to provide an adjustable length cord which utilizes the cord lock. This adjustable length cord enables any of a number of items to be secured and/or interconnected.

In a first embodiment, the cord lock of the present invention employs teardrop shaped openings or engagement areas in a generally cylindrical body, the openings being arranged such that when the cord is under tension, it will be pulled into the v-shaped portion of the opening and be frictionally clamped thereby. A second embodiment is configured as an open-sided cord lock into which the cord strand may be easily woven into engagement. In addition, a slide lock is shown for positive locking of the position of the cord in non-cylindrically shaped locking devices.

A third embodiment of cord lock employs a generally horizontal v-shaped channel to enhance the gripping of the cord and enables adjustment of both ends of the cord to produce the desired length. A fourth embodiment uses a locking ring which can be rotated about the periphery of the cylindrical cord lock between a cord engaging/locking position and a non-engaging adjustment position to engage both the incoming and the outgoing strands and positively lock them against movement. An alternative of this fourth embodiment uses two separate locking rings to permit the incoming and outgoing strands to be locked individually.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which

FIG. 5A is a cross-sectional side view of a second embodiment of the cord lock of the present invention;

FIG. 5B is a cross-sectional end view of the embodiment of FIG. 5A as seen along line 5B—5B;

FIG. 7A is a top view of a fourth embodiment of the cord lock of the present invention with the cord broken away for clarity;

FIG. 7B is a top view of the locking ring used in the FIG. 7A embodiment;

FIG. 8A is a top view of a fifth embodiment of the cord lock of the present invention particularly useful with cords of indefinite length;

FIG. 8B is a cross-sectional side view of the fifth embodiment; and

FIG. 8C is a top view of the elongated member of the fifth embodiment of the cord lock with the cord removed.

DETAILED DESCRIPTION OF THE PREFERRED EMBODIMENTS

Figure 1:
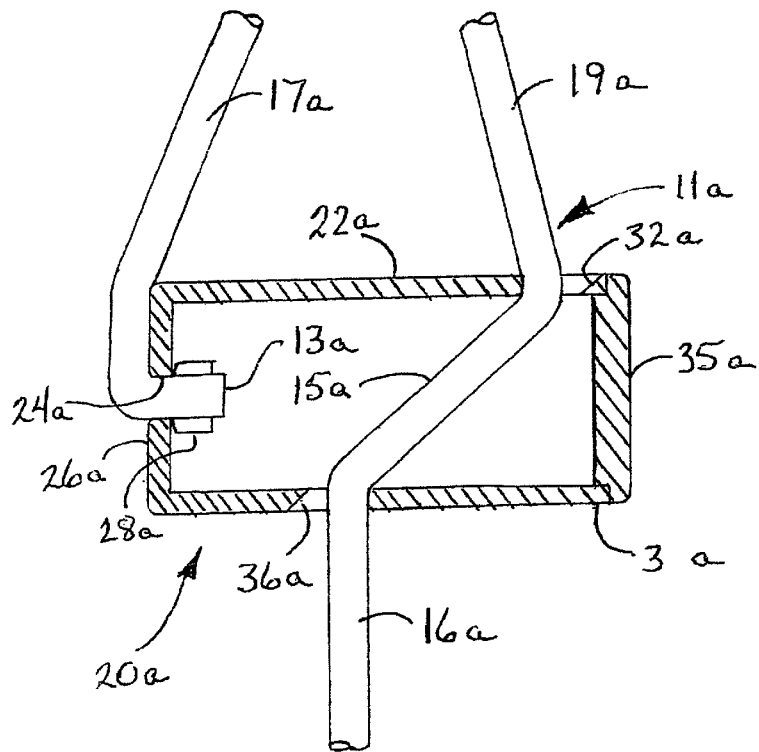
FIG. 1 is a cross-sectional side view of a first embodiment of the cord lock of the present invention.
Figure 2:
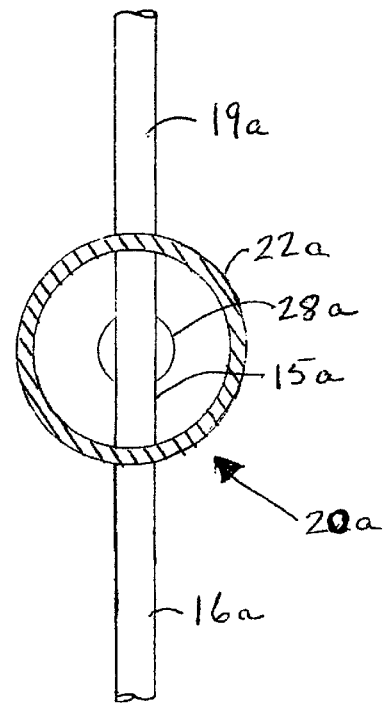
FIG. 2 is a cross-sectional end view showing the first embodiment.
Figure 3:
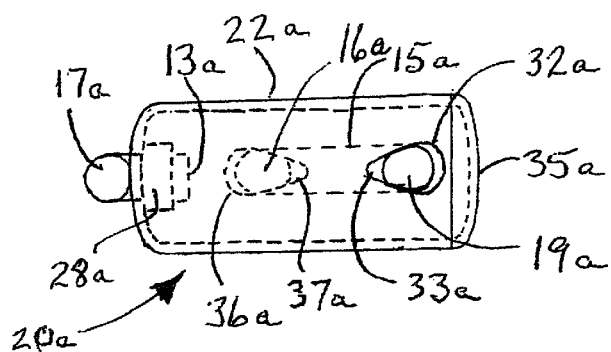
FIG. 3 is a top view of a first embodiment of the cord lock of the present invention.

A first embodiment of the cord lock of the present invention is depicted in FIGS. 1–4B generally at 20a. The term "cord" as it is used uniformly throughout the specification, includes cords of all diameters and materials, including bungee cords and ropes and will be dimensioned to accommodate the particular cord with which it is used. Cord 11a is a single length of cord (FIG. 4A). Cord lock 20a has a generally cylindrical body 22a with a first closed end 26a having a first opening 24a therein. Opening 24a receives first end 13a of first cord portion 17a and a preferably metallic element 28a is crimped thereon to secure first end 13a in cylindrical body 22a. Cylindrical body 22a is hollow and second end portion 34a is capped by element 35a. Openings 32a and 36a are teardrop shaped (FIG. 3) and the non-axial tension forces of cord lengths 16a and 19a result in the cord portion 15a being drawn into v-shaped areas 33a and 37a effecting a pinching of cord portion 15a enhancing the frictional resistance to movement of the cord and, hence, providing secure locking.

Figure 4A:
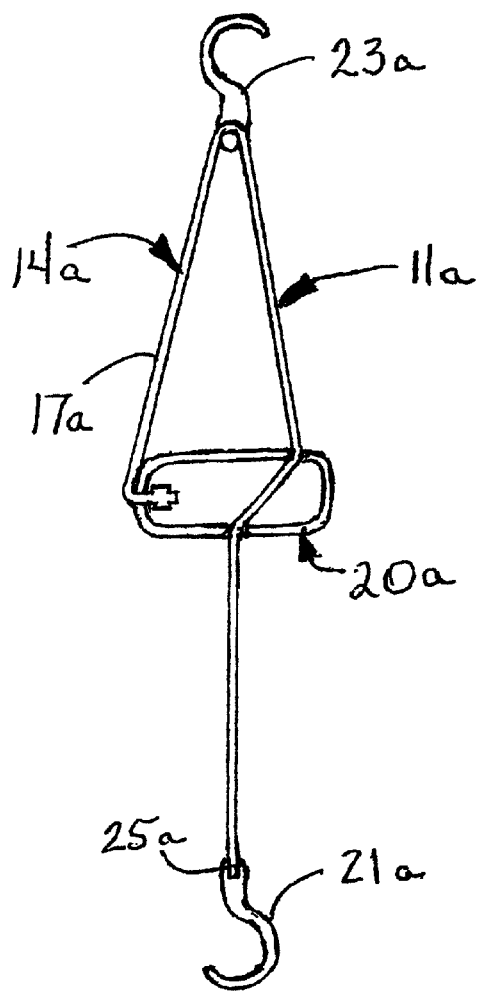
FIG. 4A is a schematic depiction of one possible use of the cord lock of the present invention.
Figure 4B:
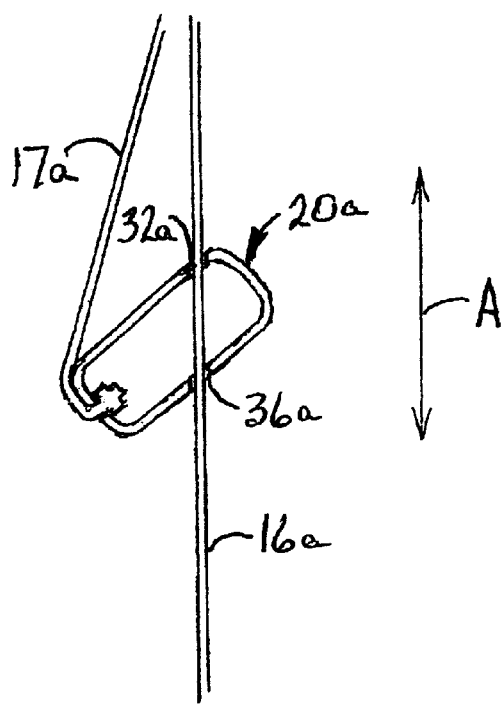
FIG. 4B is a schematic drawing showing the orientation of the lock during adjustment.

FIGS. 4A and 4B also depict one use of the cord lock 20a of the present invention. Fixed length cords are seldom the right length. Generally, they are either too long or too short. In this application, the cord 11a is equipped with a first hook 21a attached to end 25a of cord 11a. Second hook 23a is mounted to slide freely along loop 14a. Hook 21a can be connected to a first article and hook 23a to a second article and lock 20a adjusted to provide the proper length of cord 11a to effect the desired connection. Alternatively, hooks 21a and 23a may engage each other around an article and lock 20a adjusted to provide the overall desired length. As yet another possibility, hook 21a can be slipped aside and loop 14a used to surround an article with hook 23a secured to another article. As seen in FIG. 4B, to adjust the location of lock 20a, the tension in cord 17a is relieved and the cord portion 19a is pulled axially in the direction of arrow A through openings 32a and 36a to move it to another position. When the non-axial forces are reinstated in cord portions 16a and 17a, the ends of cord section 15a will be pulled laterally into v-shaped portions 33a and 37a (FIG. 3) locking them against relative movement.

A second embodiment of the lock of the present invention is depicted in FIGS. 5A and 5B generally at 20b. First opening 24b is formed in first end region 26b, while second opening 32b is formed in second end region 34b. Third opening 36b extends substantially over ½ the length of the bottom of lock 20b. This permits the end 13b to be wound about block 38b. This block has a v-shaped groove 39b (FIG. 5B) extending about its inward periphery. As the cord portion 17b is tensioned, cord 13b is pulled into groove 39b pinching and securing it in place. Opening 32b in end portion 34b is teardrop shaped with v-shaped regions 33b and elongated opening 36b has a v-shaped region 37b. V-shaped regions 33b and 37b will receive the ends of tensioned cord portion 15b pinching them and securing them against movement. This embodiment 20b permits both ends 13b and 16b to be adjusted in lock 20b providing the system with additional flexibility.

Figure 6A:
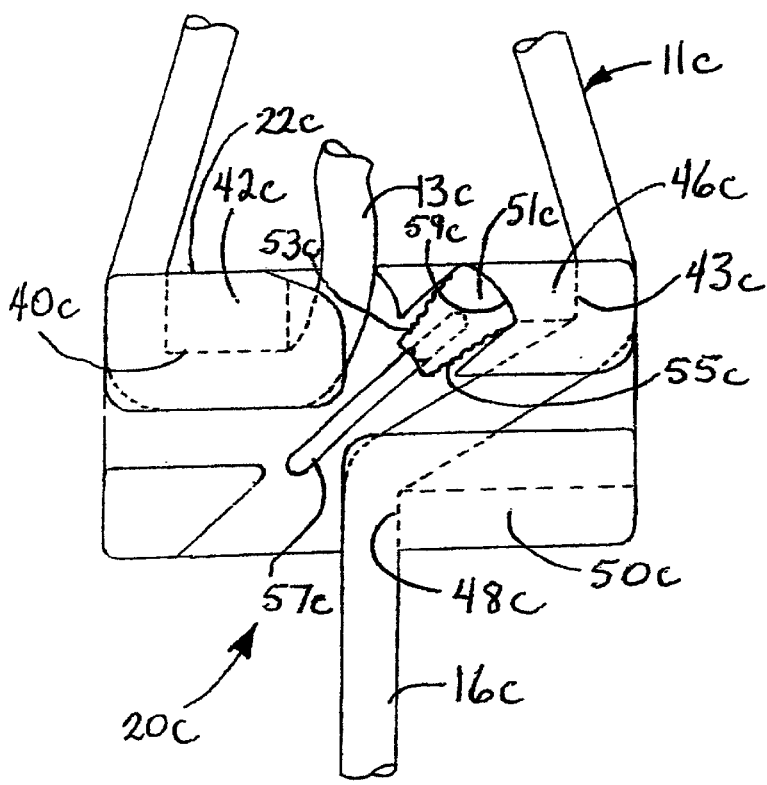
FIG. 6A is a side view of a third embodiment of the cord lock of the present invention.
Figure 6B:
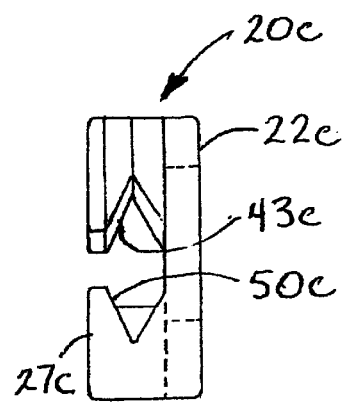
FIG. 6B is an end view of the embodiment depicted in FIG. 6A.

A third embodiment is depicted in FIGS. 6A and 6B generally at 20c. In this embodiment, although peripheral wall 22c substantially surrounds the longitudinal axis of lock 20c, one side 27c of the lock 20c is open. This enables ends 13c and 16c of cord 11c to be woven into the lock 20c easily. V-shaped grooves 40c, 44c, and 48c in quadrant portions 42c, 46c and 50c respectively, will retain cord 11c against undesired removal through the side 27c. Tapered wedge lock 51c has a pin on its lower surface (not shown) which slides in slot 57c. Sides 53c and 55c of wedge lock 51c are serrated and, when engaged with cord portions 13c and 16c, will provide positive locking engagement. As with the previous embodiment, lock 20c permits both ends to be adjusted to provide the desired configuration and the v-shaped grooves 40c, 44c, and 48c will pinch the cord 11c retaining it until adjustment is desired. To adjust one or both ends 13c and 16c, wedge lock 51c is slid back in slot 57c into pocket 59c, cord 11c adjusted, and wedge lock 51c re-engaged.

A fourth embodiment is depicted in FIG. 7A generally at 20d. Cord lock 20d has first opening means 24d comprised of first (52d) and second (54d) teardrop shaped openings in first end portion 26d to receive first end 13d of the cord. Second opening means 39d is comprised of a teardrop shaped openings 32d and 36d through which second cord portion 15d extends. Annular locking ring 60d surrounds barrel-shaped member 20d and is maintained in a fixed axial position relative thereto by lugs 58d, or the like. It will be appreciated that a variety of other known devices could be used to secure locking ring 60d in position. Locking ring 60d can be flexed (out of round) in order to slide it over lugs 58d. Locking ring 60d has two identical semi-annular portions, so one will be described. A recess 62d is formed in locking ring 60d to provide a disengaged position so that cord 11d can be adjusted. A serrated region 64d extends between recess 62d and the full width 66d of locking ring 60d. The exterior of locking ring 60d has knurled portions 68d to facilitate gripping and rotation. By rotating locking ring 60d to where recesses 62d align with cord portions 13d and 16d, both ends of cord 11d can be adjusted to provide the desired configuration. Once the desired position is obtained, cord 11d can be tensioned and locking ring 60d rotated to bring serrated regions 64d into contact with cord portions 13d and 16d locking them against movement. Tensioning the cord prior to locking could prove important since this will reduce the diameter of portions 13d and 16d; if done after the locking ring 60d is adjusted it could potentially loosen the grip of locking ring 60d.

Figure 7C:
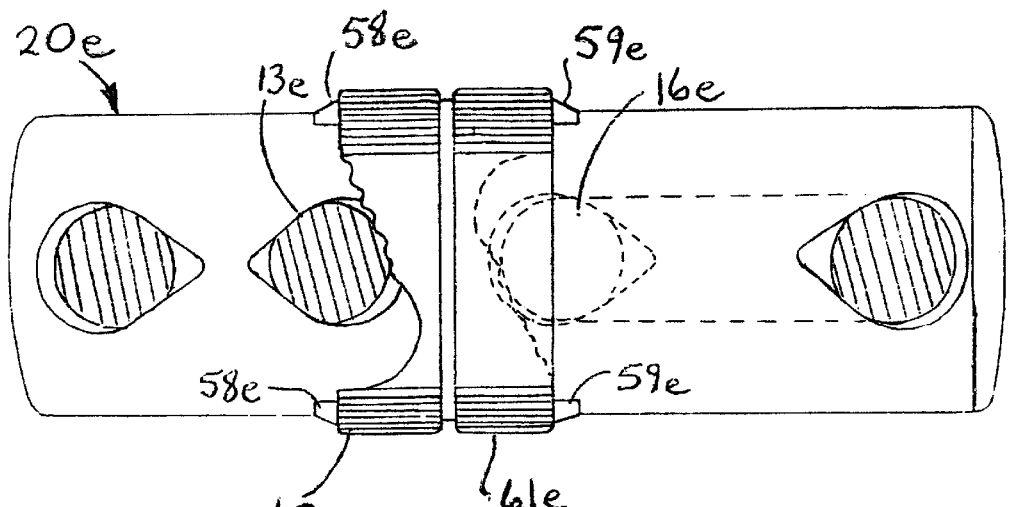
FIG. 7C is a variation of the fourth embodiment with an alternate locking means.

In certain applications, it was found to be potentially beneficial to be able to separately adjust the positions of cord portions 13 and 16. Accordingly, as seen in FIG. 7C, a modification of the fourth embodiment is provided in which two separate locking rings 60e and 61e are provided to permit the cord portion 13e to be positioned and tensioned before locking ring 60e is secured and cord portion 16e to be positioned and tensioned before locking ring 61e is secured. Lugs 58e engage ring 60e and lugs 59e engage ring 61e to prevent their movement outwardly. Spacer lugs (not shown) may be utilized to keep the rings 60e and 61e from touching so that the locking rotation of one does not effect the position of the other.

The use of this fourth embodiment becomes problematic with the use of a long rope or one where the second end is attached (e.g., the rope is fed from a coil). Accordingly, the embodiment 20f shown in FIGS. 8A–C has a laterally extending slot 70f that permits the cord 11 to be doubled on itself and pushed through slot 70f. The loop which protrudes out the far side is twisted and passed around the first end 26f of elongated member 22f and seated in annular groove 72f. As seen in FIG. 8B, this will result in cord portion 11f impinging on cord portion 13f resulting in a locking of this first end of cord 11. The cord sections 16f and 19f are fed through teardrop shaped openings 32f and 36f as in the fourth embodiment. Locking ring 60f engages cord portion 16f forcing it into the v-shaped portion of opening 32f securing it against axial movement.

Several embodiments of cord locks 20 have been disclosed. Each locking device relies on a v-shaped portion of the passage through which the cord passes to pinch the cord 11 as a result of forces acting in a direction which does not lie along the axis of the openings through which the cord passes (non-axial forces). An adjustable length cord device is also disclosed which uses any of these cord lock embodiments. A single length of cord 11 has one hook fixed to a first end and a second slidable hook. The hooks can be used to engage to separate elements, can engage one another, or the slidable hook can be allowed to droop and the cord look defined by the cord lock 20 used to wrap an item and the fixed hook 25a used to secure the element to another article. The fifth embodiment is particularly adapted for use with indefinite length cords or cords where the one end is unavailable.

Various changes, alternatives and modifications will become apparent to one of ordinary skill in the art following a reading of the foregoing specification. For example, by slightly modifying the size/shape of the openings in the cylindrical elongated member, the locking device could be made to function with straps, as well as cords. It is intended that any such changes, alternatives and modifications as fall within the scope of the appended claims be considered part of the present invention.

I claim:
1. A cord lock comprising
a) an elongated member having an outer peripheral wall substantially surrounding a longitudinal axis, a first end portion, a second end portion opposite said first end portion, first, second, and third openings in said elongated member, said second and third openings including a non-cylindrical cross-section which includes a v-shaped portion;
b) said first opening comprising a slot extending laterally through said outer peripheral wall adjacent said first end portion;
c) an annular groove extending about said outer peripheral wall between said first end portion and said slot;
d) a first cord portion extending through said slot and being wrapped about said outer peripheral wall to lie in said annular groove such that a first pass of said first cord portion will impinge upon a second pass of said first cord portion lying in said annular groove to lock said first cord portion against movement;
e) a second cord portion engaging said elongated member, the second cord portion extending through said second and said third openings to adjustably define a size of a cord loop between the first and second cord portions; whereby the second cord portion will slide freely through said second and third openings when the cord is drawn axially there through but will be drawn laterally into said v-shaped portion of said second and third openings thereby locking said second cord portion against axial movement when the ends of said second cord portion are subjected to non-axial forces.

2. The cord lock of claim 1 wherein said elongated member is a generally cylindrical barrel-shaped member.

3. The cord lock of claim 2 further comprising a locking ring secured about said barrel-shaped member against movement along said longitudinal axis while permitting relative rotational movement, said locking ring having a recess therein which, when rotated into alignment with said second cord length, enable said second cord portion to be adjusted relative to said barrel-shaped member.

4. The cord lock of claim 1 wherein said second and third openings are generally tear-drop shaped openings arranged such that the non-axial force causes an end of said second portion of said cord to be drawn into said v-shaped portion at one side of said tear-drop shaped opening effectively pinching said second portion of said cord and locking it in position.

5. The cord lock of claim 1 further comprising a generally horizontally extending v-shaped channel, said v-shaped channel pinching the first cord portion to lock said cord in position when at least one of the ends of the first cord portion is subjected to a non-axial force, rendering an effective length of said cord adjustable.

6. The cord lock of claim 1 wherein said elongated member has an open side permitting the cord to be woven into said cord lock through said open side.

7. A cord lock comprising
e) an elongated generally barrel shaped member having a peripheral wall substantially surrounding a longitudinal axis, a first end portion, a second end portion opposite said first end portion, first and second opening means in said elongated member, said first and second opening means each including a non-cylindrical cross-section which includes a v-shaped portion;
f) a first cord portion engaging said elongated member and extending through said first opening means;
g) a second cord portion engaging said elongated member, the second cord portion extending through said second opening means to adjustably define a size of a cord loop between the first and second cord portions;
h) locking means including a first element with serrated edges for engaging said first cord portion and a second element with serrated edges for engaging said second cord portion, said first and second elements each comprising one of a pair of locking rings which each encircle said elongated member and are independently adjustable to secure each said first and second cord portion, respectively, against significant axial movement;
whereby said first and second cord portions will slide freely through said first and second opening means when the cord is drawn axially there through but will be drawn laterally into said v-shaped portion of said first and second opening means thereby locking said first and second cord portions, respectively, against axial movement when the ends of said first and second cord portions are subjected to non-axial forces.

8. The cord lock of claim 7 wherein said barrel shaped member has first opening means extending through a first body portion of said cord lock and a second opening means extending through a second body portion of said cord lock.

9. The cord lock of claim 8 wherein said first opening means comprises first and fourth openings and second opening means comprises a second and third openings through which said first and second cord portions respectively pass.

10. The cord lock of claim 9 wherein each said annular ring has an aligned recess which can be respectively rotated to positions adjacent said first and said second cord portions where said respective locking ring is disengaged from its said cord portion and each of said first and said second cord portions can be adjusted in said first and second opening means while said cord lock is disengaged.

11. The cord lock of claim 9 wherein each opening comprises a tear-drop shaped opening and each said locking ring has a serrated portion which, in locking position, engage its said respective first and second cord portions and push them into v-shaped areas where said first and said second cord portions are pinched, securing said cord portions against movement.

* * * * *